(12) United States Patent
Reeves et al.

(10) Patent No.: US 11,391,498 B2
(45) Date of Patent: Jul. 19, 2022

(54) BIDIRECTIONAL FILTER DRIER

(71) Applicant: Parker-Hannifin Corporation, Cleveland, OH (US)

(72) Inventors: Christopher Reeves, Saint Charles, MO (US); David Derner, New Haven, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 463 days.

(21) Appl. No.: 16/313,587

(22) PCT Filed: Jul. 27, 2017

(86) PCT No.: PCT/US2017/044102
§ 371 (c)(1),
(2) Date: Dec. 27, 2018

(87) PCT Pub. No.: WO2018/022843
PCT Pub. Date: Feb. 1, 2018

(65) Prior Publication Data
US 2020/0309428 A1    Oct. 1, 2020

Related U.S. Application Data

(60) Provisional application No. 62/367,147, filed on Jul. 27, 2016.

(51) Int. Cl.
*F25B 43/00*    (2006.01)
*B01D 29/05*    (2006.01)
(Continued)

(52) U.S. Cl.
CPC ............ *F25B 43/003* (2013.01); *B01D 29/05* (2013.01); *B01D 35/02* (2013.01); *B01D 35/15* (2013.01);
(Continued)

(58) Field of Classification Search
CPC ........... F25B 43/00; F25B 43/02; F25B 43/04
See application file for complete search history.

(56) References Cited

U.S. PATENT DOCUMENTS 4,318,809 A * 3/1982 Bethel .................. F25B 43/003
                                                    210/136
6,235,192 B1 * 5/2001 Melfi ................. B01D 53/0431
                                                    210/287

(Continued)

FOREIGN PATENT DOCUMENTS

WO    WO-2015060995 A1 *  4/2015 ............. B01D 53/02
WO    WO 2015060995 A1     4/2015

OTHER PUBLICATIONS

International Search Report of PCT/US2017/044102 dated Oct. 19, 2017.

*Primary Examiner* — Youngsul Jeong
(74) *Attorney, Agent, or Firm* — Renner, Otto, Boisselle & Sklar, LLP

(57) ABSTRACT

A bidirectional filter drier has a generally spherical outer shell having a first opening and a second opening. The shell contains a desiccant core and first and second filter elements. The first filter element is on a first side of the core, adjacent the first opening, and the filter flexible element on a second side of the core adjacent the second opening. The first filter element and the second filter element control flow around and through the core depending on the direction of fluid flow through the filter drier.

12 Claims, 2 Drawing Sheets

(51) Int. Cl.
*B01D 53/04* (2006.01)
*F25B 43/02* (2006.01)
*F25B 43/04* (2006.01)
*B01D 35/02* (2006.01)
*B01D 35/15* (2006.01)
*B01D 53/26* (2006.01)

(52) U.S. Cl.
CPC ............ *B01D 53/04* (2013.01); *B01D 53/261* (2013.01); *F25B 43/02* (2013.01); *F25B 43/04* (2013.01); *B01D 2257/80* (2013.01)

(56) References Cited

U.S. PATENT DOCUMENTS

| 9,951,980 B2 * | 4/2018 | Reeves | B01D 53/02 |
| 2012/0217198 A1 * | 8/2012 | Chen | F25B 43/003 |
| | | | 210/323.1 |

* cited by examiner

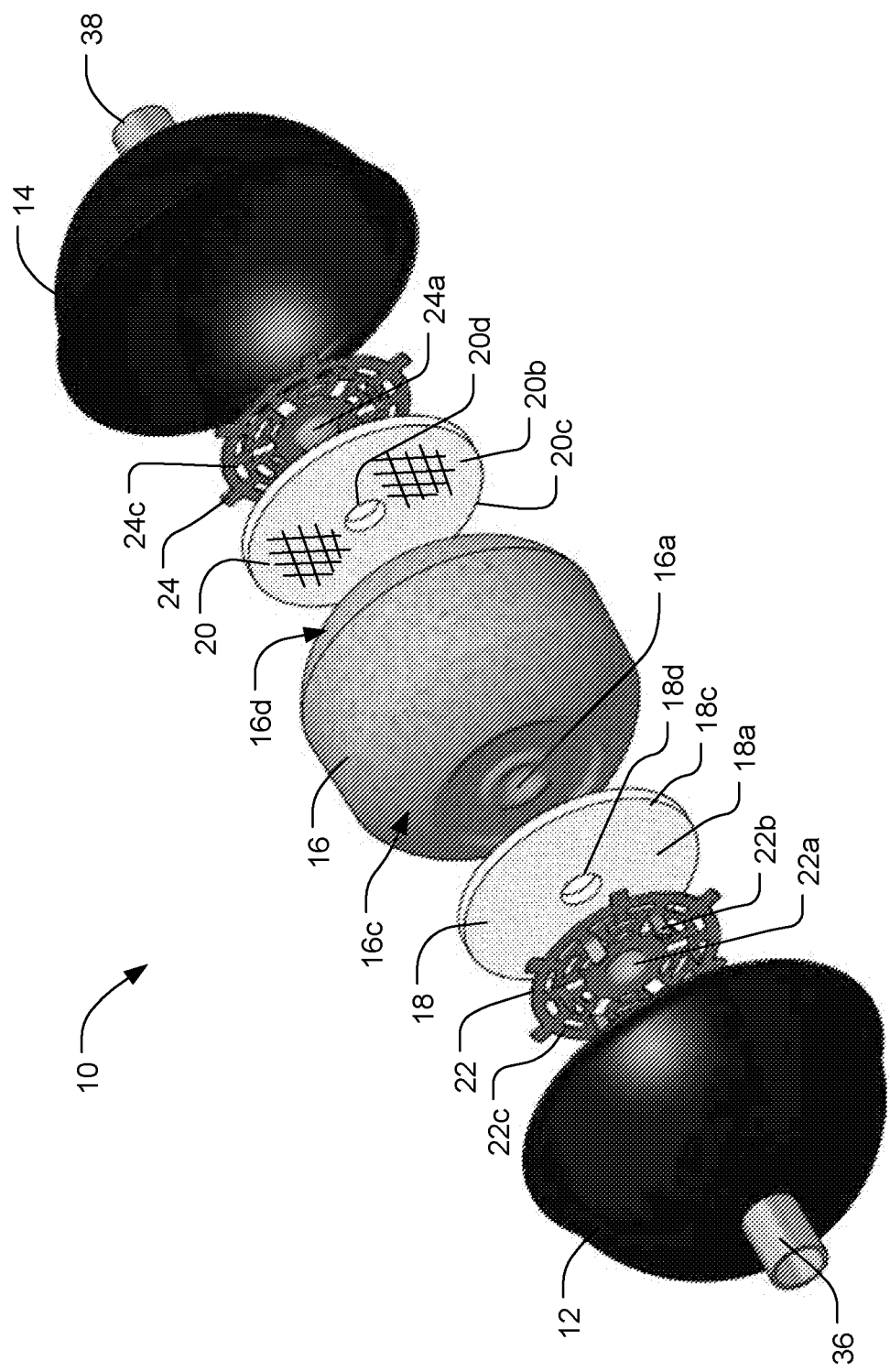

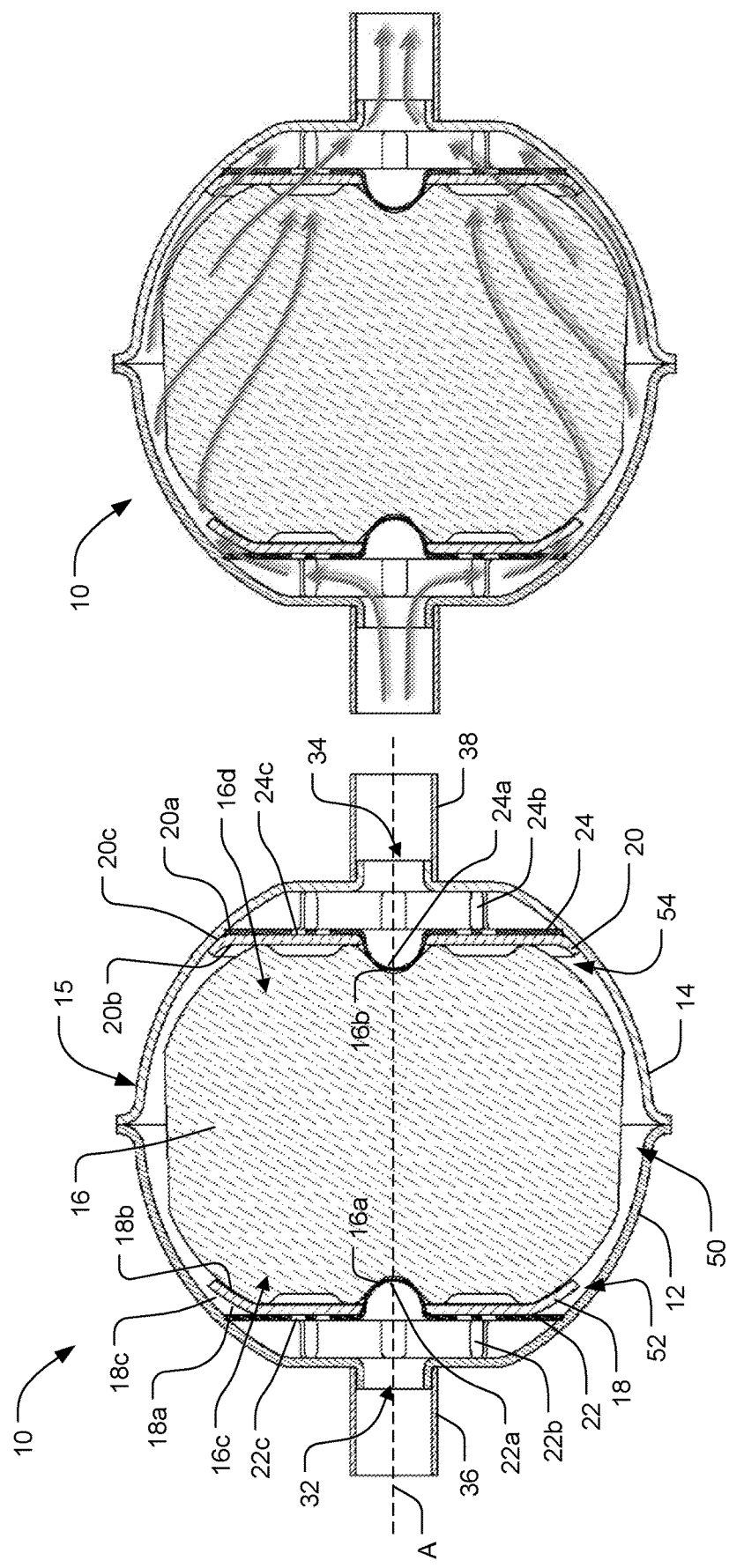

BIDIRECTIONAL FILTER DRIER

CROSS REFERENCE TO RELATED APPLICATIONS

The present application claims the benefit of the filing date of U.S. Provisional Patent Application Ser. No. 62/367,147, filed Jul. 27, 2016, the disclosure of which is incorporated herein by reference.

TECHNICAL FIELD

This application relates to contaminant and moisture control in a heating, ventilation, air conditioning and refrigeration (HVACR) system.

BACKGROUND

The function of a filter drier in a HVACR system is to remove harmful contaminants, such as moisture, acid, copper oxides, particulates, metal chips, wax-like compounds and the like from refrigerant in the system. Over time, elevated levels of such contaminants can jeopardize the system's useful life and adversely affect system performance.

A bidirectional filter drier is used in heat pump applications and is designed to accommodate refrigerant flow in two directions. The flow in a bidirectional filter drier must be directed such that contaminants that are filtered in one direction are not reintroduced into the system when the flow is reversed. A typical construction includes a check valve on either side of a desiccant core. Refrigerant flowing in one end of the filter drier is blocked by the check valve and directed through a plurality of holes about the periphery of the check valve. The refrigerant then passes through the desiccant core, through a screen to filter large contaminants and out the check valve on the opposite side of the core. The filter drier functions the same way when flow is reversed, thus directing the flow through the center of the filter drier in both directions and capturing all contaminants on an internal side of the screens.

SUMMARY

A problem with conventional bidirectional filter driers is the complexity of their design. The bidirectional filter drier disclosed herein is a simplified and less expensive alternative to conventional cylindrical filter driers. The filter drier disclosed herein is generally spherical in shape, with a pair of flexible filter elements on either side of a desiccant core. The flexible filter elements and core assembly are held in compression by supports located on either side of the core and filter elements. The supports, filter elements and core are held in compression by the outer shell such that there is a space forming a circumferential pathway between the core and the outer shell.

When fluid flows through the filter drier from the first opening to a second opening, an edge portion of the first filter element is deflected to open a pathway between the filter element and the outer shell. An edge portion of the second filter element is deflected against the outer shell to form a compliant seal that obstructs the pathway to the second opening. The fluid flows in the open pathway past the first filtration element and then is forced through the second filter element and/or through the core and the second filter element, resulting in the removal of contaminants from the fluid. The operation is reversed when the flow is from the second opening to the first opening, with the edge portion of the second filter element being deflected to open the pathway and the edge portion of the first filter element being deflected against the outer shell to form a compliant seal such that fluid is filtered through the first filter element and/or the first filter element and the core.

According to one aspect of the invention, the bidirectional filter drier can have an outer shell defining a first opening and a second opening. The outer shell contains a desiccant core. A flow path is formed by a space between the outer shell and the core. The filter drier has a first filter element at a first end of the core adjacent the first opening, and a second filter element at a second end of the core adjacent the second opening. The first filter element and the second filter element selectively block the flow path. When flow is from the first opening to the second opening the first filter element is spaced from the outer shell to allow fluid to flow along the flow path, and the second filter element is in contact with the outer shell thereby blocking the flow path such that the fluid is forced through the through the core and the second filter element. When flow is reversed (e.g., when flow is from the second opening to the first opening), the second filter element is spaced from the outer shell to allow fluid to flow along the flow path, and the first filter element is in contact with the outer shell thereby blocking the flow path such that the fluid is forced through the through the core and the first filter element.

According to another aspect of the invention, a bidirectional filter drier includes a generally spherical outer shell having a first opening and a second opening. The filter drier has a desiccant core with a first flexible element on a first side of the core adjacent the first opening, and a second flexible element on a second side of the core adjacent the second opening. The first filter element and the second filter element control flow around and through the core.

According to another aspect, the bidirectional filter drier has a generally spherical outer shell, and a pair of flexible filter elements on either side of a desiccant core. The flexible filter elements and core held in compression by a pair of supports that are compressed by the outer shell when the filter drier is assembled such that the core is spaced from the outer shell, thereby forming a pathway between the core and the outer shell. Fluid pressure causes the flexible filter elements to open/obstruct the pathway to direct the fluid through the core and the filter element that obstructs the pathway.

Further features will become apparent from the following detailed description when considered in conjunction with the drawings.

BRIEF DESCRIPTION OF THE DRAWINGS

Embodiments of this invention will now be described in further detail with reference to the accompanying drawings, in which:

FIG. 1 is an exploded view of a bidirectional filter drier;

FIG. 2 is a cross-sectional view of the bidirectional filter drier of FIG. 1; and FIG. 3 is a cross-sectional view of the bidirectional filter drier of FIG. 1 illustrating a fluid flow path through the filter drier.

DETAILED DESCRIPTION

An exemplary bidirectional filter drier 10 in accordance with aspects of the invention is shown in FIGS. 1-3. The illustrated filter drier has a pair of outer shells 12 and 14 that house a core 16, a pair of filter elements 18 and 20, and a pair of supports 22 and 24.

The outer shells 12 and 14 are hemispherical shells that form a generally sphere-shaped outer shell 15 when assembled together. The shells may be joined together, for example, by welding. The outer shell has a pair of openings 32 and 34, which can be coupled to other components of a fluid system, such as a HVACR system (e.g., a heat pump system) via tube stubs 36 and 38. Each opening 32 and 34 can form an inlet or outlet for fluid flowing through the filter drier based on the operational state of the system.

The shell 30 forms a housing for the core 16. The primary function of the core is to remove moisture from the fluid flowing through the filter drier. The core may be a molded core, beaded desiccant, or another suitable material for adsorbing moisture. The core may include features 16*a* and 16*b* for aligning the core relative to the filter elements and elements. The features may be depressions in the core for engaging the supports, as described in more detail below.

Larger contaminants are removed from the fluid by the first and second filter elements 18 and 20. The first filter element is disposed at a first end 16*c* of the core adjacent the first opening 32. The second filter element is disposed at a second end 16*d* of the core adjacent the second opening 34. The filter elements are constructed from a flexible material, such as synthetic resin or polymer. In one embodiment, the filter elements are polyester pads.

The general structure of the filter elements will be described in detail with respect to filter element 18. The filter element is an annular disc-shaped member having a first surface 18*a* that faces the opening 32 and a second surface 18*b* that faces the core 16. An outer portion 18*c* forms a flap that selectively engages the outer shell to control the flow of fluid around and through the filter element. In a relaxed (or unpressurized) state, the filter element, and in particular the flap 18*c*, can be in contact with the interior of the shell. As flow enters the assembly through opening 32, the fluid will pass between the filter element 18 and the interior of the shell, slightly deflecting the flap 18*c* to allow a clear flow path, as described in more detail below. The filter element also has a central opening 18*d*, for registering and/or centering the filter element relative to the core and support.

The surfaces 18*a* and 18*b* may adapted such that the first surface 18*a* is a contaminant deflecting surface and the second surface 18*b* is a contaminant capturing surface. This allows the filter element to capture contaminants primarily on the core (or interior) side of the filter element, which prevents the contaminants from being released back into the system when the fluid is flowing through the filter drier in the opposite direction.

In the illustrated embodiment, the first surface 18*a* is a generally smooth surface that does not substantially capture contaminants, and the second surface 18*b* is a rough surface that is adapted to capture the contaminants. The second surface 18*b* may be enhanced by singeing, calendaring, needle punching or otherwise modifying the surface. Flow through the filter drier from the first opening 32 to the second opening 34 is therefore deflected by the first surface 18*a* around the filter element 18 to the second filter element 20. Under reverse flow conditions when refrigerant is flowing through the filter drier from the second opening 34 to the first opening 32, the flow is directed into the second surface 18*b* where the contaminants are trapped.

The first filter element 18 is retained relative to the core by the first support 22. Extending from a center portion of the support is a protrusion 22*a*. The protrusion extends in the direction of the core and the first filter element. The protrusion extends through the central opening 20*d* of the first filter element and engages the depression 16*a* in the core. The protrusion 22*a* can have a convex surface and the depression 16*a* can have a concave surface such that the surfaces are configured to mate with one another so that the filter element 18 and support 22 are aligned on a central axis A of the core and filter drier assembly.

The first support also has one or more projections 22*b* that extend from the surface of the support in the direction of the first opening 32. The projections 22*b* engage the inner wall of the outer shell adjacent the first opening 32. Fluid flowing through the filter drier can pass through the support via a plurality of holes 22*c* through the surface of the support. In the illustrated embodiment, the support is a disk-shaped screen and the projections are a plurality of prongs.

The second filter element 20 is the same or similar to the first filter element 18. The second filter element 20 has a first surface 20*a* that faces the second opening 34 and a second surface 20*b* that faces the core 16. The surfaces 20*a* and 20*b* may adapted for selective filtration of the contaminants with the first surface 20*a* being relatively smooth to deflect contaminants and the second surface being relatively rough to capture contaminants. An outer portion 20*c* forms a flap that selectively engages the outer shell to control the flow of fluid around and through the filter element. The filter element also may include a central opening 20*d*, for registering and/or centering the filter element relative to the core and second support.

The second support 24 is the same or similar to the first support 22. Extending from a center portion of the second support is a protrusion 24*a*. The protrusion extends in the direction of the core and the first filter element. The protrusion extends through the central opening 20*d* of the second filter element 20 and engages the depression 16*b* in the core 16. The protrusion 24*a* can have a convex surface and the depression 16*b* can have a concave surface such that the surfaces are configured to mate with one another so that the filter element 18 and support 22 are aligned on a central axis A of the core and filter drier assembly.

The support also has one or more projections 24*b* that extend from the surface of the support in the direction of the second opening 34. The projections 24*b* engage the inner wall of the outer shell adjacent the first opening 34. In the illustrated embodiment, the projections are one or more prongs. Fluid flowing through the filter drier can pass through the support via a plurality of holes 24*c* through the surface of the support.

The filter drier 10 is assembled such that the first and second filter elements 18 and 20, first and second supports 22 and 24, and the core 16 are held in compression by the outer shell. The alignment of the supports and filter elements relative to the axis A of the core and filter drier assembly helps to ensure that the core is spaced from the inner surface of the shell. This space forms a circumferential flow path 50 for fluid flowing through the filter drier.

The flow path 50 includes a first portion 52 between the first portion of the core 16*c* and the outer shell 12 and a second portion 54 between the second portion of the core 16*d* and the outer shell 14. Despite the compression of the assembly, the flaps 18*c* and 20*c* remain moveable to direct the flow of fluid around or through the core.

More particularly, the arrows in FIG. 3 illustrate the flow path of fluid through the filter drier 10 from the first opening 32 to the second opening 34. Fluid pressure deflects the flap 18*c* of the first filter element 18 against the core 16, thereby opening portion 52 of the pathway 50. Fluid pressure also causes flap 20c on the second filter element 20 to deflect against the outer shell, thereby obstructing pathway portion 54. The fluid tends to take the path of least resistance and therefore the fluid flows around the first filter element 18 though pathway portion 52 until it encounters flap 20c in pathway portion 54 which prevents the fluid from bypassing the second filter element 20. The obstruction causes a portion to the fluid to flow in one of two paths before exiting through the opening 34. The fluid may flow either directly through the second filter element 20 or the fluid may flow through the core 16 and then through the second filter element 20. The flow of fluid through the core and second filter element removes moisture and contaminants from the fluid.

During reverse flow when the fluid is flowing from the second opening 34 to the first opening 32, the fluid pressure deflects the flap 20c of the second filter element 20 against the core 16, thereby opening pathway portion 54 of the pathway 50. The fluid pressure also causes the flap 18c on the first filter element 18 to deflect against the outer shell 12, thereby obstructing the portion 52 of the pathway 50. Again, the fluid tends to take the path of least resistance and therefore it fluid flows around the second filter element 20 though pathway portion 54 until it encounters flap 18c in pathway portion 52 which prevents the flow from bypassing the first filter element 18. The obstruction causes a portion to the fluid to flow in one of two paths before exiting through the opening 32. The fluid may flow either directly through the first filter element 18 or the fluid may flow through the core 16 and then through the second filter element 18. The flow of fluid through the core and first filter element removes moisture and contaminants from the fluid.

In this manner, the flow is always filtered through the second surfaces 18b and 20b of the filter elements, which are on the interior (or core side) of the filter elements. This reduces the risk that contaminants in one filter element are reintroduced into the system when the flow is reversed through that filter element.

To the accomplishment of the foregoing and related ends, the invention comprises the features fully described herein and particularly pointed out in the claims. The description and the annexed drawings set forth in detail certain illustrative embodiments of the invention. These embodiments are indicative, however, of but a few of the various ways in which the principles of the invention may be employed. Other objects, advantages and novel features of the invention will become apparent from the detailed description of the invention when considered in conjunction with the drawings.

The invention claimed is:

1. A bidirectional filter drier comprising:
   an outer shell defining a first opening, a second opening;
   a desiccant core contained within the outer shell,
   a flow path formed by a space between the outer shell and the desiccant core for fluid flowing in a first direction from the first opening to the second opening, and a second reverse direction from the second opening to the first opening;
   a first filter element at a first end of the desiccant core adjacent the first opening, and a second filter element at a second end of the desiccant core adjacent the second opening, wherein the first filter element and the second filter element are configured to deflect relative to the outer shell to selectively block the flow path such that:
   in a first operational state for fluid flowing in the first direction, the first filter element is deflected from the outer shell to open a pathway between the first filter element and the outer shell and allow fluid to flow through the flow path, and the second filter element is deflected against the outer shell thereby obstructing the flow path such that the fluid is forced through the second filter element; and
   in a second operational state for fluid flowing in the second reverse direction, the second filter element is deflected from the outer shell to open a pathway between the second filter element and the outer shell and allow fluid to flow through the flow path, and the first filter element is deflected against the outer shell thereby blocking the flow path such that the fluid is forced through the first filter element.

2. The bidirectional filter drier of claim 1, wherein the first filter element comprises a first annular flap and the second filter element comprises a second annular flap, wherein the first annular flap and second annular flap selectively block the flow path.

3. The bidirectional filter drier of claim 1, wherein the first filter element comprises a contaminant deflecting surface that faces the first opening and a contaminant filtering surface that faces the desiccant core.

4. The bidirectional filter drier of claim 1, wherein the second filter element comprises a contaminant deflecting surface that faces the second opening and a contaminant filtering surface that faces the desiccant core.

5. The bidirectional filter drier of claim 4, wherein the first filter element comprises a contaminant deflecting surface that faces the first opening and a contaminant filtering surface that faces the desiccant core.

6. The bidirectional filter drier of claim 1, comprising a first support that holds the first filter element in position relative the desiccant core and a second support that holds the second filter element relative to the desiccant core.

7. The bidirectional filter drier of claim 6, wherein the first support comprises a first projection in the direction of the first opening, and the second support comprises a second projection in the direction of the second opening, wherein the first projection engages the outer shell adjacent the first opening and the second projection engages the outer shell adjacent the second opening.

8. The bidirectional filter drier of claim 7, wherein the first support, the first filter element, the desiccant core, the second filter element and the second support are held in compression by the outer shell.

9. The bidirectional filter drier of claim 6, wherein the first support comprises a protrusion that extends through a hole in the first filter element and which is received by a corresponding depression in the desiccant core, and wherein the second support comprises a protrusion that extends through a hole in the second filter element and which is received by a corresponding depression in the desiccant core.

10. The bidirectional filter drier of claim 1, wherein the outer shell is generally spherical in shape.

11. The bidirectional filter drier of claim 1, wherein:
   in the first operational state for fluid flowing in the first direction, an edge portion of the first filter element is deflected from the outer shell to open the pathway between the first filter element and the outer shell and allow fluid to flow through the flow path, and an edge portion of the second filter element is deflected against the outer shell thereby obstructing the flow path such that the fluid is forced through the second filter element; and
   in the second operational state for fluid flowing in the second reverse direction, an edge portion of the second filter element is deflected from the outer shell to open the pathway between the second filter element and the outer shell and allow fluid to flow through the flow path, and an edge portion of the first filter element is deflected against the outer shell thereby blocking the flow path such that the fluid is forced through the first filter element.

12. The bidirectional filter drier of claim 1, wherein:
in the first operational state for fluid flowing in the first direction, an edge portion of the first filter element is deflected from the outer shell to open the pathway between the first filter element and the outer shell and allow fluid to flow through the flow path, and an edge portion of the second filter element is deflected against the outer shell to form a compliant seal, thereby obstructing the flow path such that the fluid is forced through the second filter element; and in the second operational state for fluid flowing in the second reverse direction, an edge portion of the second filter element is deflected from the outer shell to open the pathway between the second filter element and the outer shell and allow fluid to flow through the flow path, and an edge portion of the first filter element is deflected against the outer shell to form a compliant seal, thereby blocking the flow path such that the fluid is forced through the first filter element.

* * * * *